(12) United States Patent
Humborg et al.

(10) Patent No.: US 11,774,603 B1
(45) Date of Patent: Oct. 3, 2023

(54) SYSTEM, METHOD AND APPARATUS FOR DETERMINING THE STATUS OF COUPLED ASSETS DURING TRANSPORT

(71) Applicant: ORBCOMM, INC., Rochelle Park, NJ (US)

(72) Inventors: Kenn Humborg, Galway (IE); Patrick Cahill, Galway (IE)

(73) Assignee: ORBCOMM, INC., Rochelle Park, NJ (US)

( * ) Notice: Subject to any disclaimer, the term of this patent is extended or adjusted under 35 U.S.C. 154(b) by 0 days.

(21) Appl. No.: 17/177,525

(22) Filed: Feb. 17, 2021

Related U.S. Application Data (60) Provisional application No. 62/977,588, filed on Feb. 17, 2020.

(51) Int. Cl.
  *G01S 19/52* (2010.01)
(52) U.S. Cl.
  CPC .................. *G01S 19/52* (2013.01)
(58) Field of Classification Search
  CPC .......... G01S 19/52; G07C 1/00; H04W 4/029; G06Q 50/30; G06Q 10/08
  See application file for complete search history.

(56) References Cited

U.S. PATENT DOCUMENTS

| | | | |
|---|---|---|---|
| 10,515,549 B1* | 12/2019 | Luomi | G08G 1/012 |
| 2017/0344023 A1* | 11/2017 | Laubinger | G08G 1/22 |
| 2018/0374111 A1* | 12/2018 | Corry | G06Q 30/0207 |
| 2019/0050475 A1* | 2/2019 | Tullimalli | G01C 21/3484 |
| 2020/0186979 A1* | 6/2020 | Liu | H04W 40/248 |
| 2021/0144526 A1* | 5/2021 | Zilberman | H04B 5/0031 |
| 2021/0295443 A1* | 9/2021 | Webster | H04W 4/029 |

FOREIGN PATENT DOCUMENTS

WO  WO-2019099417 A1 * 5/2019 ............. B60L 13/06

* cited by examiner

*Primary Examiner* — Timothy A Brainard
*Assistant Examiner* — Kenneth W Good (57) ABSTRACT

The present invention provides a system, method and apparatus for determining the status of coupled assets during transport. According to a first preferred embodiment, a method of the present invention preferably includes triggering a set of tracking devices to transmit time stamp data indicating when the tracked assets cross pre-set speed thresholds. The present invention preferably further includes comparing the received time stamp data to equivalent data points from other assets and identifying unique pairs of assets which crossed the same speed thresholds at similar times and positions (i.e. matching velocity profiles). The system then designates the unique pair of assets as coupled and may apply custom tracking rules and power saving algorithms to the coupled assets.

19 Claims, 7 Drawing Sheets

SYSTEM, METHOD AND APPARATUS FOR DETERMINING THE STATUS OF COUPLED ASSETS DURING TRANSPORT

RELATED APPLICATIONS

The present application claims priority to U.S. Provisional Application No. 62/977,588 filed Feb. 17, 2020.

BACKGROUND AND FIELD OF THE PRESENT INVENTION

Field of the Present Invention

The present invention relates generally to providing vehicle telematics and fleet tracking. More specifically, the present invention teaches a system, method and apparatus for determining the status of coupled assets during transport.

Background of the Invention

In mixed fleets of tractor units (trucks) and trailers, it is useful to know which tractor unit is coupled with which trailer or trailers. In many cases, each tractor and trailer is fitted with a tracking device which periodically reports the asset's position to a central telematics/tracking service. Many end-users would like to see a clear indication in their user interface of which tractors are pulling which trailers. This can be a significant challenge for large fleets managed over wide geographic areas.

The most common method for determining whether tracked assets are coupled requires user input to select and confirm the coupling of assets. This method has proven unreliable and untimely. Other methods (such as taught by U.S. Pat. No. 10,388,161 and EP Publ. No. EP2929631A1) use a dedicated sensor to confirm the pairing of assets, but these systems require each tractor and trailer to be fitted with linked hardware. Providing such hardware is expensive and difficult to make uniform across large fleets of mixed assets.

Alternative methods rely on GPS data from the tracked assets to provide enough geolocation information to determine which assets are physically coupled together. These methods, however, have proven to be undesirable for a number of reasons. First, the rate of position reporting of the assets are not generally frequent enough to converge the set of candidate matches to a single candidate in a reasonable time. Additionally, the GPS data points reported by the assets are generally not fully synchronized so that the position reports of a coupled tractor-trailer may indicate significant spatial separation based solely on the time differences in reporting. This then requires the bearing and speed of each data point to be included in the calculations, in order to "dead-reckon" between the data points. Not only does this require extensive processing, this type of calculation is only reliable if the assets are moving in nearly-straight lines at fixed speeds.

SUMMARY OF THE INVENTION

To minimize the limitations found in the prior art, the present invention provides a system, method and apparatus for determining the status of coupled assets during transport.

According to a first preferred embodiment, the present invention includes a system and method for first setting speed thresholds for a set of tracking devices within an identified area of interest. Additionally, the method includes triggering the tracking devices to begin local high-frequency GPS sampling to calculate the velocity of each tracked asset and to transmit time stamp data indicating when tracked assets cross pre-set speed thresholds.

According to a preferred embodiment, the tracking devices may preferably take samples of the GPS speed (every second), and record the time, to within one second, of when the asset crosses a pre-defined threshold. Each device may then send individual data points (e.g. timestamp, latitude, longitude, speed) to a central server/service for processing. Thereafter, the exemplary method of the present invention compares the received time stamp data to the equivalent data points from other assets and identifies pairs of assets which crossed the same speed thresholds at similar times and positions (i.e. matching velocity profiles).

The system then preferably determines whether unique pairs of assets (e.g. one tractor/truck and one trailer) having matching velocity profiles are identified. If so, the system of the present invention preferably designates the unique pair of assets as coupled and may apply custom tracking rules and power saving algorithms to the coupled assets.

BRIEF DESCRIPTION OF DRAWINGS

The accompanying drawings, which are incorporated in and constitute part of the specification, illustrate various embodiments of the present invention and together with the description, serve to explain the principles of the present invention.

DETAILED DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to'), rather than the mandatory sense (i.e. meaning "must"). Further, it should also be understood that throughout this disclosure, unless logically required to be otherwise, where a process or method is shown or described, the steps of the method may be performed in any order (i.e., repetitively, iteratively or simultaneously) and selected steps may be omitted. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor to enable the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter.

The terms "program," "computer program," "software application," "module" and the like as used herein, are defined as a sequence of instructions designed for execution on a computer system. In addition, for each of the embodiments described herein, the corresponding form of any such embodiment may be described herein as, for example, "a computer configured to" perform the described action. Any such computer, program, computer program, module or software application may include a subroutine, a function, a procedure, an object implementation, an executable application, an applet, a servlet, a source code, an object code, a shared library, a dynamic load library and/or other sequence of instructions designed for execution on a computer system. A memory or data storage means, as defined herein, includes many different types of computer readable media including volatile storage such a RAM, buffers, cache memory, and network circuits.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc.

With reference now to FIGS. 1-7, the present invention teaches a system, method and apparatus for determining the status of coupled assets during transport. As should be understood, the examples discussed herein are intended to be illustrative and any of a variety of alternative systems, embodiments and/or configurations may be used with the present invention without limitation.

Figure 1:
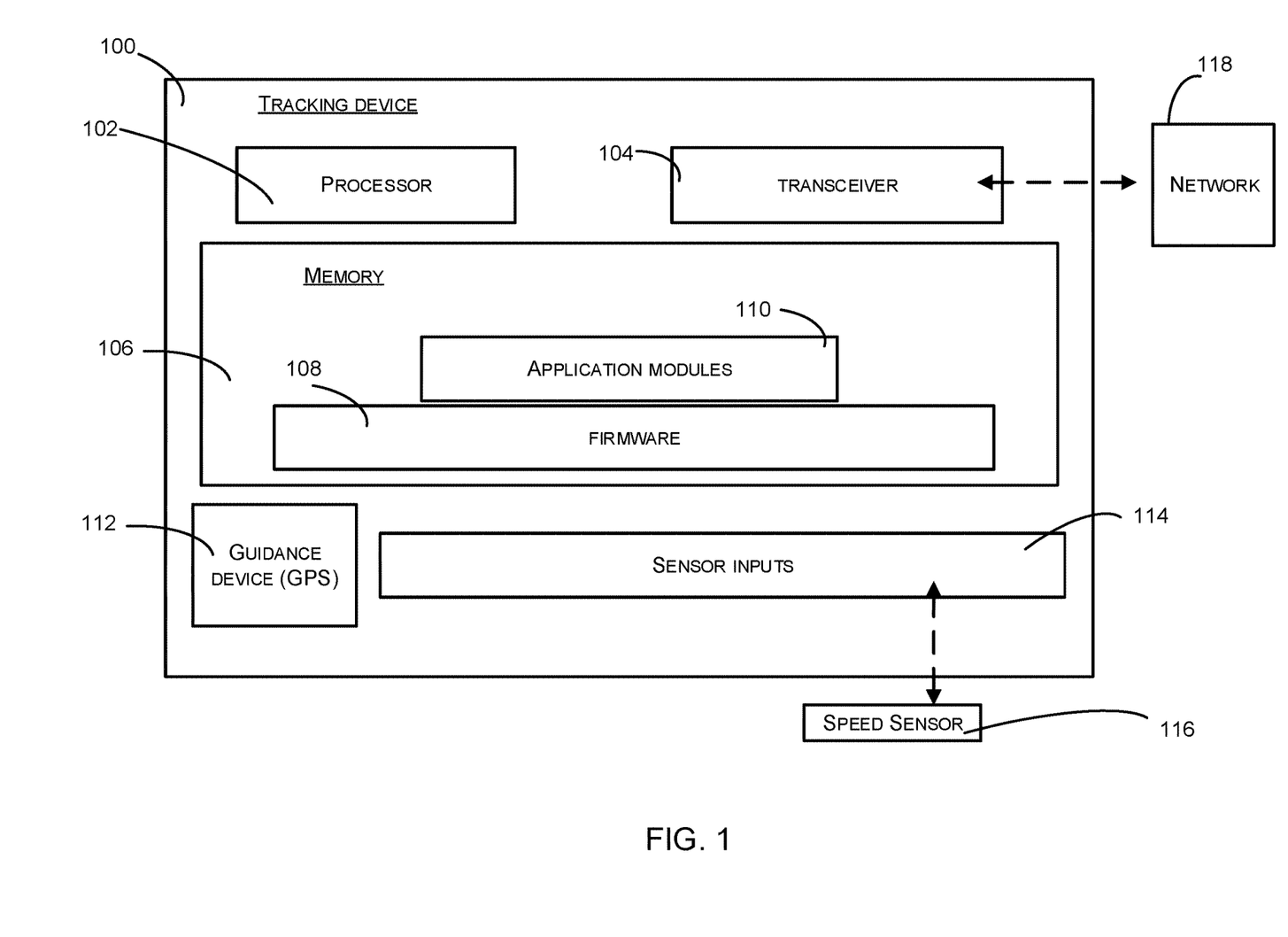
FIG. 1 shows a block diagram of an exemplary telematics/tracking device in according with a first preferred embodiment of the present invention.

With reference now to FIG. 1, an exemplary telematics/tracking device 100 which represents functionality to control one or more operational aspects of the present invention will now be discussed. As shown, the exemplary tracking device 100 preferably includes elements such as a processor 102, memory 106, firmware 108, application modules 110 and a transceiver 104 for communicating with an outside network 118. The processor 102 preferably provides processing functionality for the tracking device 100 and may include any number of processors, micro-controllers, or other processing systems. The processor 102 may execute logic stored in the firmware 108 and one or more application modules 110 that implement techniques described herein. The memory 106 may be any computer-readable media that provides storage functionality to store various data associated with the operation of the present invention, including software programs and code segments mentioned above, or other data to instruct the processor 102 and other elements of the tracking device 100 to perform the steps described herein. The transceiver 104 preferably provides functionality to enable the tracking device 100 to communicate with one or more networks 118 through a variety of components such as wireless access points, transceivers and so forth, and any associated software employed by these components (e.g., drivers, configuration software, and so on).

In implementations, the tracking device 100 preferably may receive input data from a global positioning system (GPS) receiver 112 or the like. Further, the tracking device 100 may be coupled to any number of other system sensors and vehicle data systems via sensor inputs 114. These sensor inputs may preferably include sensors such as speed sensors 116. Additional sensors may include sensors such as: accelerometers, temperature sensors, camera inputs and other environmental/vehicle sensing devices.

Figure 2:
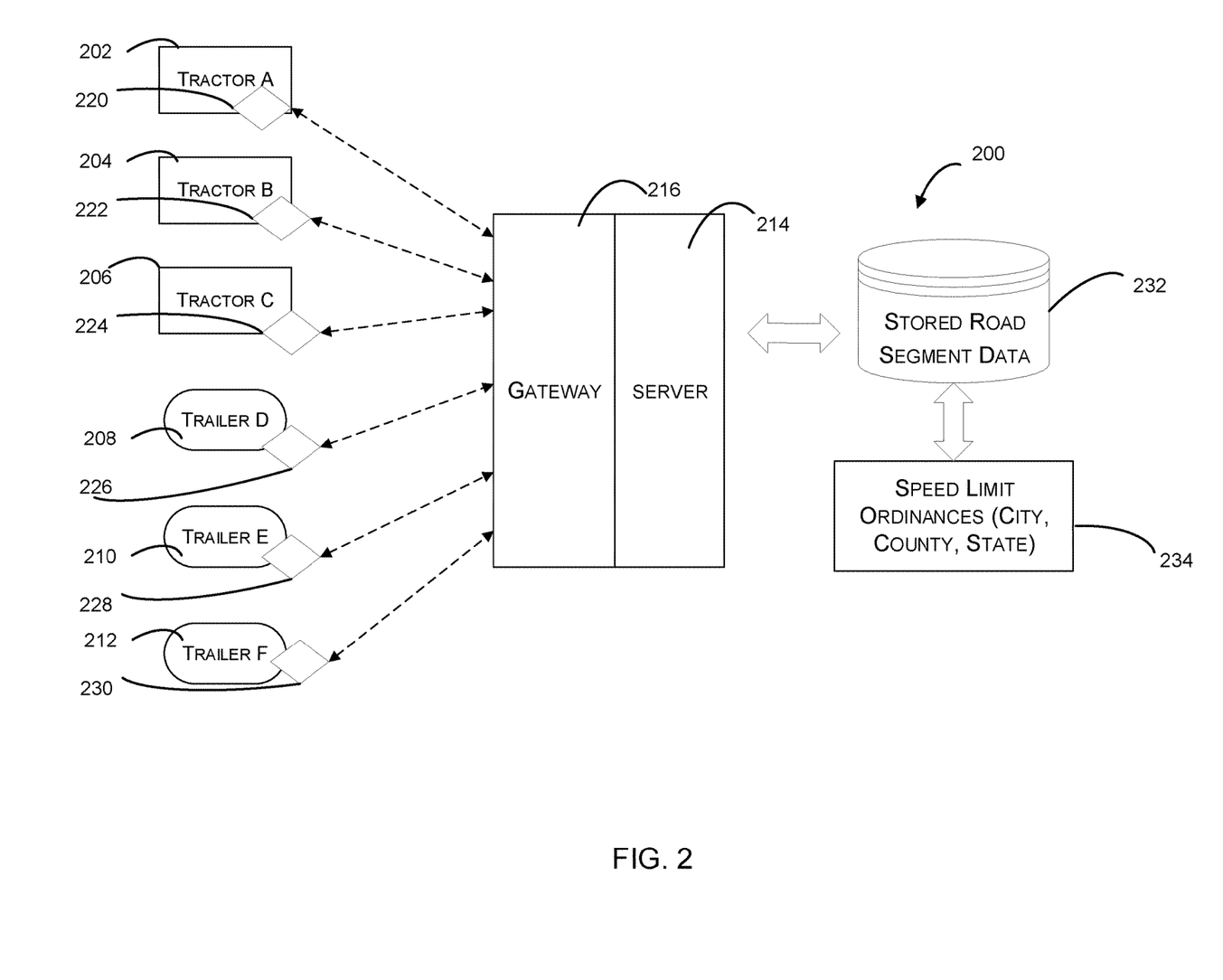
FIG. 2 shows an exemplary data management system in accordance with a first preferred embodiment of the present invention.

With reference now to FIG. 2, an exemplary data management system for use with the present invention shall now be discussed. As shown, a group of monitored tracking devices 220-230 are preferably attached to assets within a given mixed fleet of tractor units 202-206 and trailers 208-212. The tracking devices 220-230 may preferably include variations and/or aspects of the exemplary tracking device 100 discussed above in FIG. 1. As further shown in FIG. 2, the tracking devices 220-230 preferably each independently exchange data with a central server/service 214. Preferably, this may occur either directly or via one or more gateways 216. Additionally, the central server 214 may receive and process additional data from any number of external databases and other sources. An exemplary database may include a first database 232 providing stored road segment data (i.e. navigation routes, route speed limits etc.) which may link to any number of third-party database 234 (e.g. state/city speed limit databases).

The communications between the central server 214 and the tracking devices 220-230 may be direct or indirect using any number of network paths, gateways 216 and/or other communication devices. The central server 214 is shown as a single processing device for convenience only. The elements and functions of the central server 214 (also referred to as the "central service") as discussed herein may be distributed among any number of servers, processors and modules, which may be located together and/or distributed over a networked system.

Figure 3:
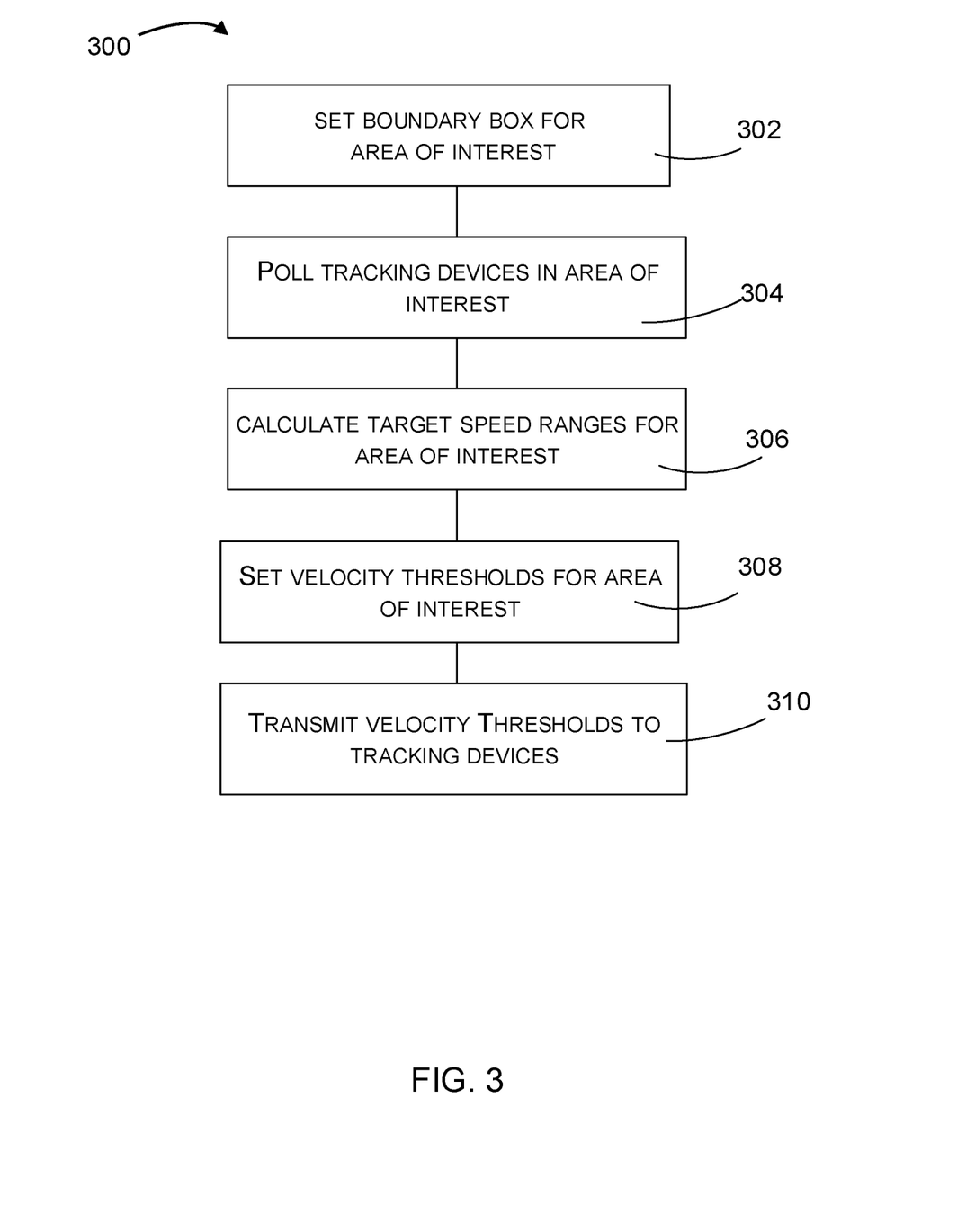
FIG. 3 is a block diagram illustrating an exemplary method in accordance with the present invention.
Figure 4:
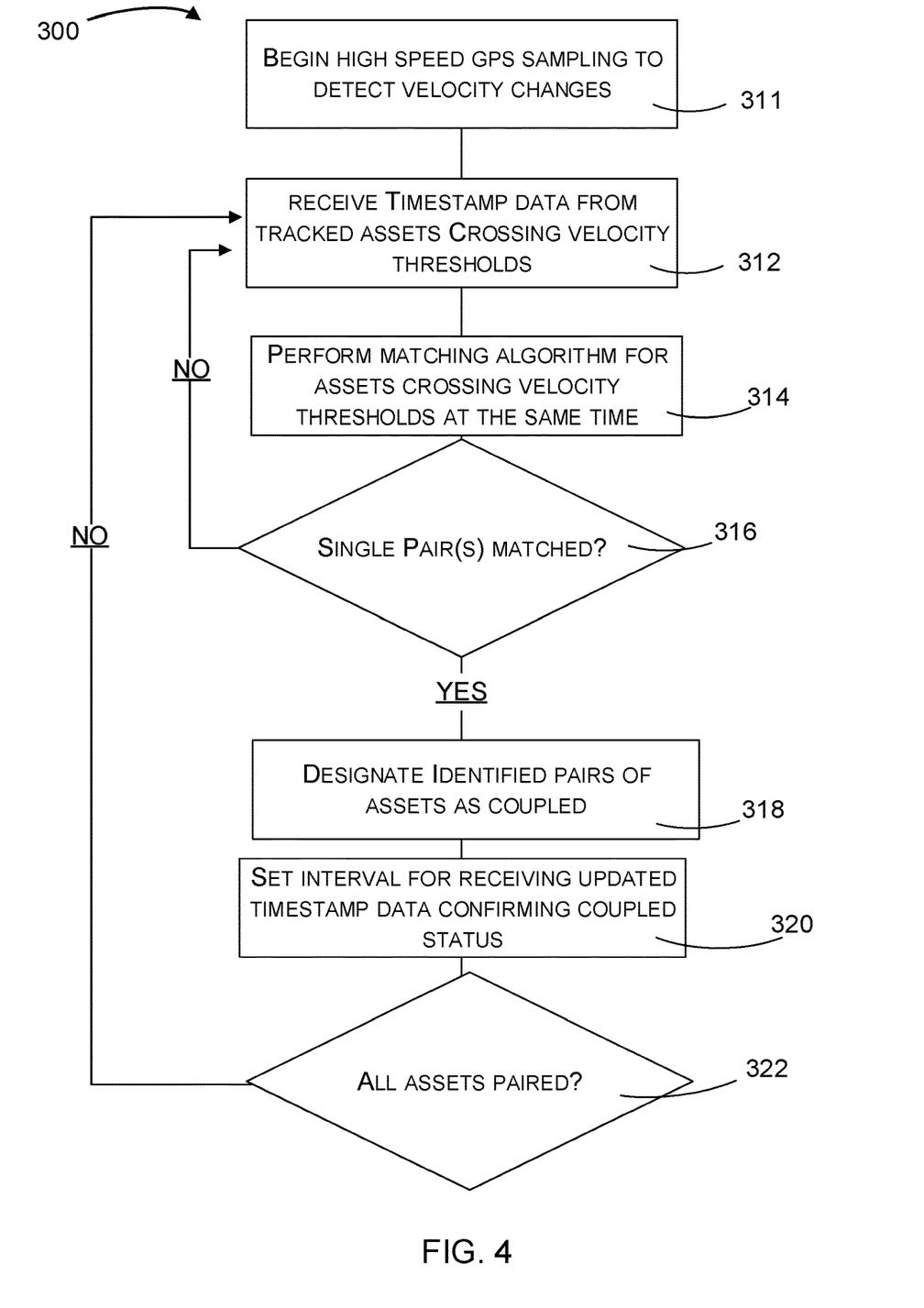
FIG. 4 is a block diagram illustrating additional steps to the method shown in FIG. 3.

With reference now to FIGS. 3-4, an exemplary method 300 in accordance with aspects of the present invention shall now be discussed. As shown, the exemplary system and method 300 of the present invention preferably detects and determines when tracked assets are physically coupled during transport. The tracked assets may include any type of vehicle or cargo. For example, these may include: rail cars attached via rail car couplings; articulated trucks coupled to trailer tractors; shipping containers attached to trailers/trucks/ships; ships under tow, and the like.

With reference now to FIG. 3, at a first step 302, the system of the present invention may preferably set a boundary box around a given area of interest. Alternatively, the system may broadcast to an entire fleet of vehicles without regard to their location. At a next step 304, the system may poll tracked assets within the area of interest. At a next step 306, the system may preferably determine speed thresholds for the identified area of interest. The system may perform this step by averaging the speed limits within a given area of interest and adjusting the speed thresholds based on the determined average. Alternately, the system may include speed thresholds for the entire range of speed limits within a given area of interest. For example, if the area of interest includes a truck depot, the system may preferably include lower threshold speeds (i.e. 10, 15 and 20 km/h). If the area of interest includes only interstate, higher threshold speeds may be selected (i.e. 60, 65 and 70 km/h). According to a preferred embodiment, the threshold speeds selected may be restricted to speeds above a lower limit (i.e. 5 km/h) to avoid the problem of a truck and trailer having different speeds during low-speed maneuvers.

At a next step 308, the system may preferably set the speed thresholds to be used and then (at step 310) transmit the selected speed thresholds to the tracking devices within the selected area of interest. Alternatively, the entire selection of speed thresholds may be performed independent of knowing the speed limits in a given area of interest. Instead, the system may use a pre-determined set of threshold speeds (i.e. every 5 km/h starting at 10 km/h) which may be pre-programmed within the firmware of each tracking device.

According to an alternative embodiment, the system of the present invention may employ a quick selection mode where one or very few speed thresholds are used to quickly determine pairings. For example, when a tractor-trailer is moving out of a transfer station/depot, a single 10 km/h threshold may be used. Thereafter, the system may use multiple thresholds to improve the confidence of the match and to reduce the impact of GPS measurement errors.

With reference now to FIG. 4, following a given prompt, at a next step 311, each tracking device may preferably begin local high-frequency GPS sampling to calculate the velocity of each tracked asset. According to a preferred embodiment, the high-frequency sampling may be initiated only when a sensor indicates a start of movement in order to conserve resources. Additionally, the system may stop the high-speed sampling once a given speed threshold has been crossed or after assets have been designated as coupled (e.g. as in step 318 below).

At a next step 312, the system may preferably receive time stamp data from each tracking device within the area of interest indicating when tracked assets cross pre-set speed thresholds. According to a preferred embodiment, the telematic devices may preferably take samples of the GPS speed (every second), and record the time, to within one second, of when the asset crosses a pre-defined threshold. Each device may then send this individual data point (e.g. timestamp, latitude, longitude, speed) to the central server/service for processing. According to a preferred embodiment, the tracking devices may process the GPS position samples locally and only transmit the timestamp data for the individual threshold crossing events to minimize data transfer costs. According to a further preferred embodiment, the tracking devices may delay transmission of the timestamp data until multiple data points for multiple threshold crossings can be transmitted together. In this way, the system may keep transmission costs to a minimum.

At a next step 314, the system may apply a matching algorithm to the time stamp data. The matching algorithm preferably compares the received time stamp data to the equivalent data points from other assets and identifies pairs of assets which crossed the same speed thresholds at similar times and positions to within pre-set margins of errors (i.e. matching velocity profiles).

At a next step 316, the system then preferably determines whether unique pairs of assets (e.g. one tractor/truck and one trailer) having matching velocity profiles are identified. If NO (e.g. the system finds no match or the system finds three or more assets sharing the same velocity profile), the system then proceeds to step 312 and receives additional time stamp data to add to the existing velocity profiles for each of the unpaired assets.

If the system at step 316 determines that a unique pair of assets share the same velocity profile (within the margin of error), the system (at step 318) preferably designates the unique pair of assets as coupled. At a next step 320, the system may then preferably set an interval for receiving updated time stamp data to confirm the assets have remained coupled. At a next step 322, the system may then preferably determine whether each pair of assets within the target area have been matched. If NO, the system will then proceed to continue receiving time stamp data (step 312) and matching pairs of assets based on additional data.

Figure 5:
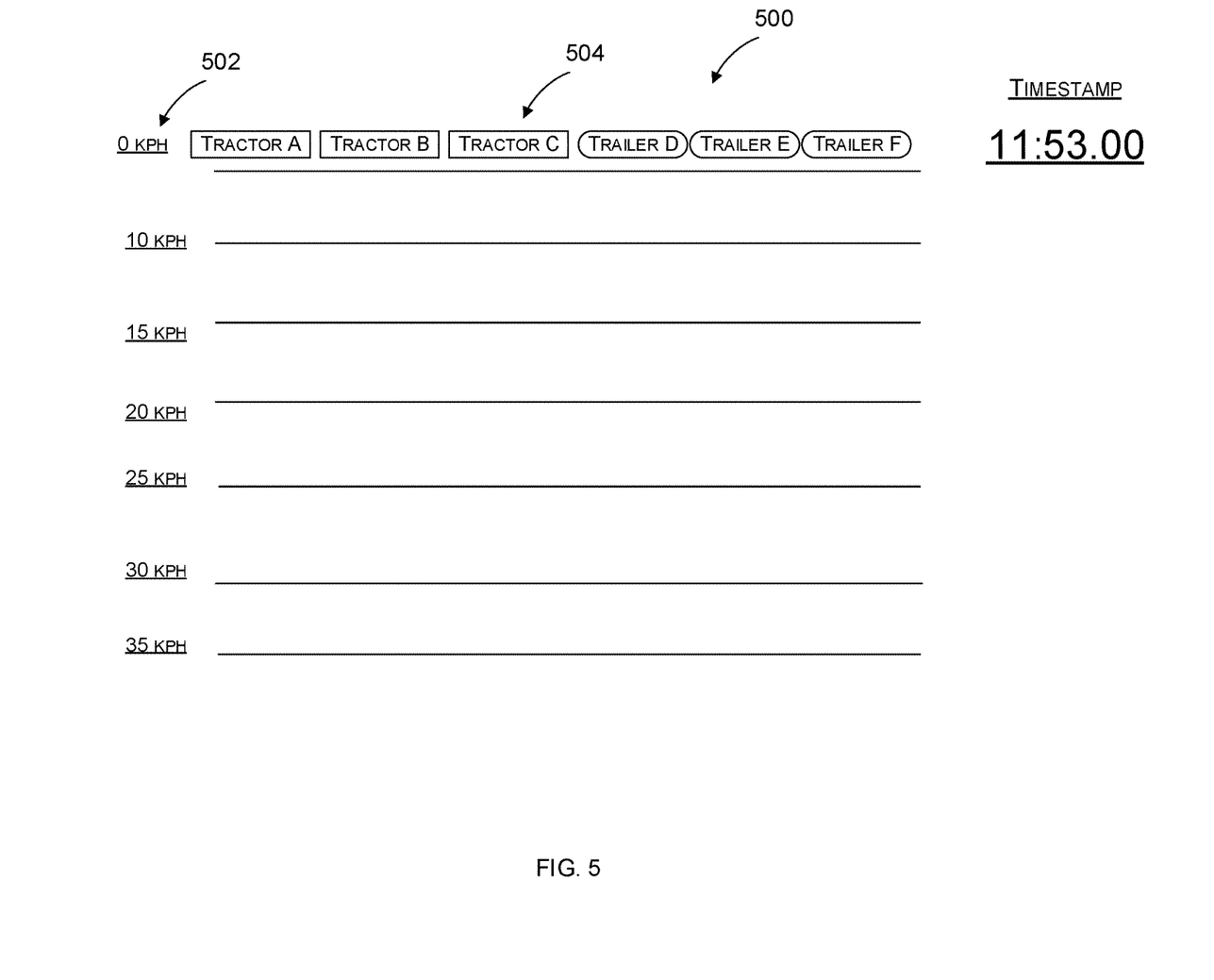
FIG. 5 is a block diagram illustrating a first reporting period of the present invention.
Figure 6:
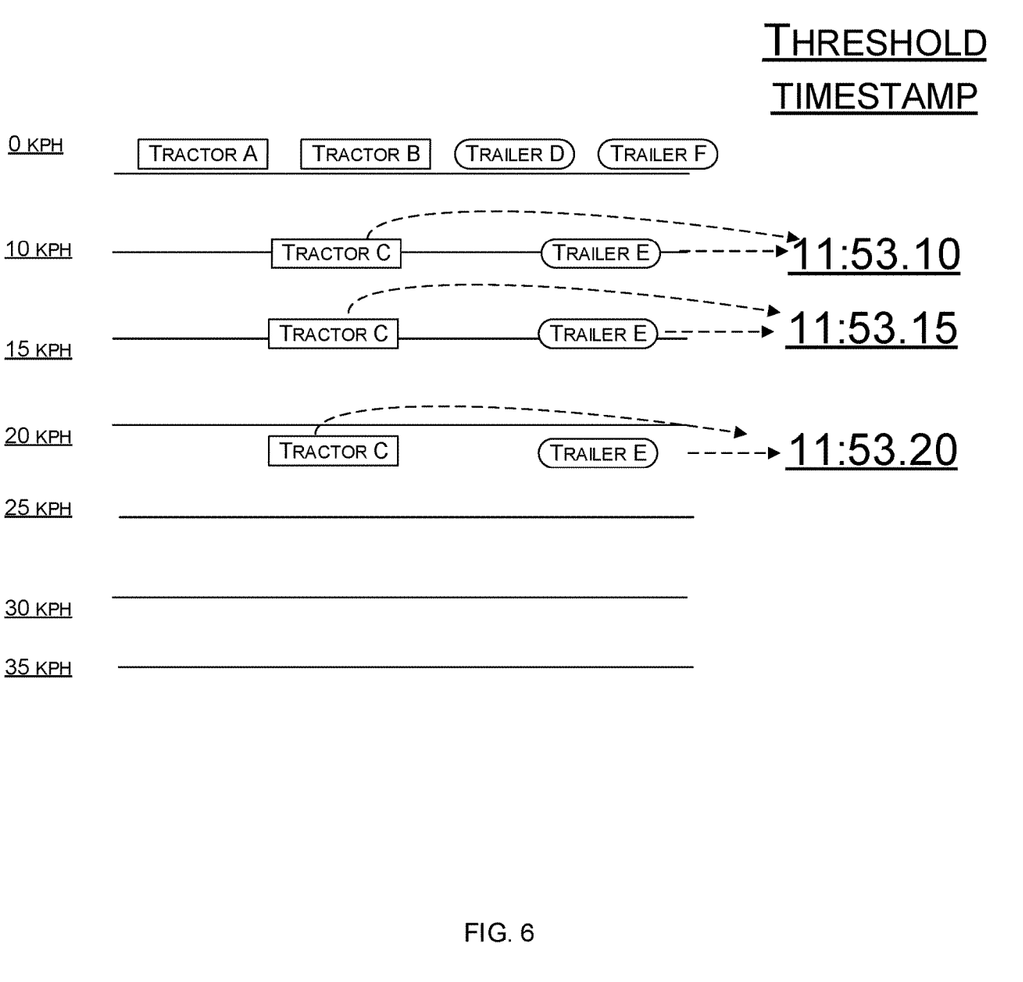
FIG. 6. is a block diagram illustrating a first set of reporting events processed by the present invention.
Figure 7:
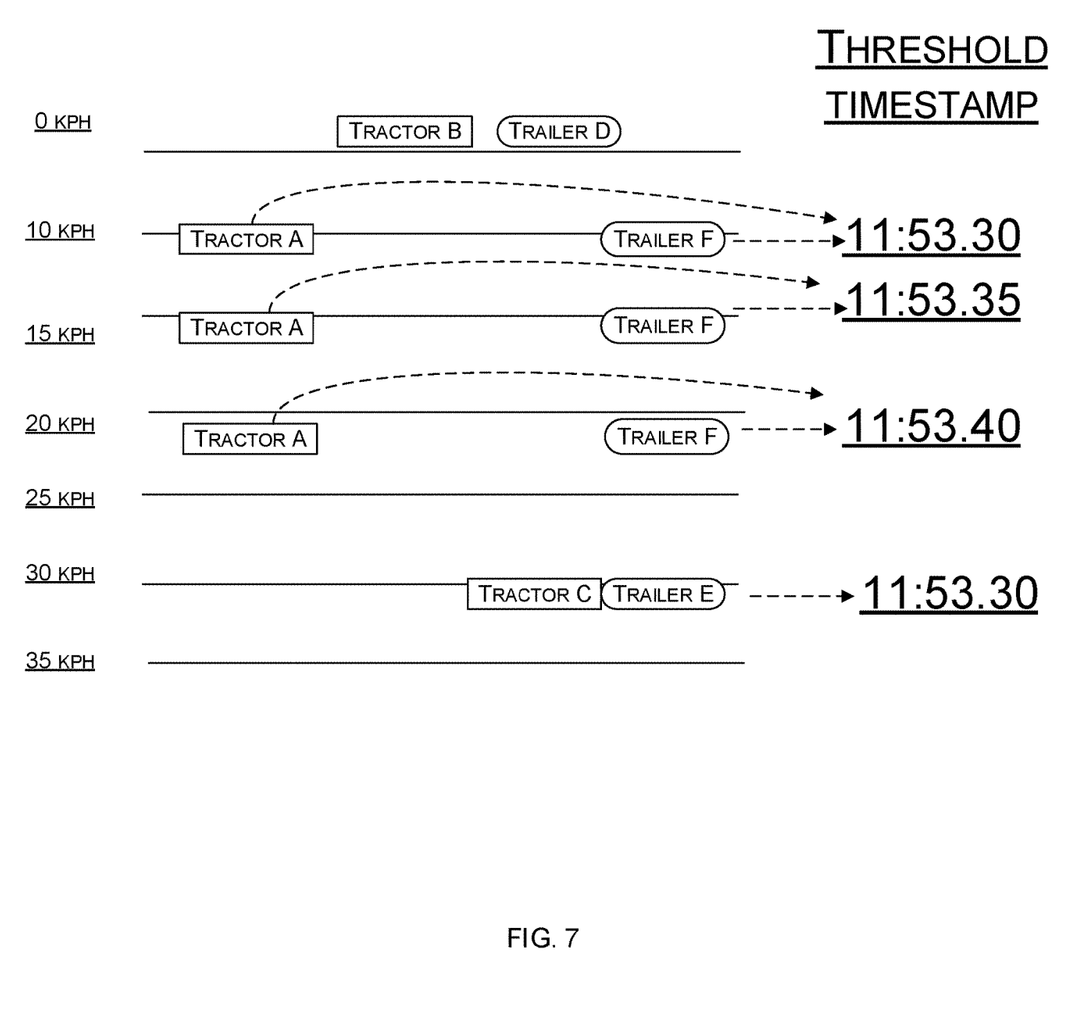
FIG. 7. is a block diagram illustrating a second set of reporting events processed by the present invention.

With reference now to FIGS. 5-7, a further illustration of the above method of the present invention shall now be discussed. With reference to FIG. 5, a first chart 500 is provided showing an identified set of tracked assets 504 (tractors A-C and trailers D-F) within a given area of interest at a given time (e.g. 11:53 am). The chart 500 further shows a set of threshold speeds 502 which will trigger time stamp data to be transmitted to the central service. In FIG. 6, the same set of assets is shown with selected assets (tractor C and trailer E) transmitting time stamp data triggered by the crossing of pre-set thresholds at 10 km/h, 15 km/h and 20 km/h. Based on this time stamp data, the system may preferably link tractor C and trailer E as coupled.

With reference now to FIG. 7, tractor C and trailer E are shown coupled and transmitting a confirming time stamp as they jointly cross the 30 km/h threshold. Additionally, tractor A and trailer F are shown transmitting time stamp data triggered by their crossing of pre-set thresholds at 10 km/h, 15 km/h and 20 km/h. Based on this time stamp data, the system can also designate tractor A and trailer F as coupled. In the example shown in FIG. 7, tractor B and trailer D remain parked and unpaired. In this instance, the system may only start the local high-frequency GPS sampling for these assets when a sensor/event indicates a start of movement.

According to a further aspect of the present invention, the system and method of the present invention may preferably further include a towing alert to be used when pairs of vehicles or shipping vessels are detected as being towed. In particular, when ships are under tow, they can present a danger to any cross-traffic which may attempt to pass between the towing boat and the vessel being towed. Accordingly, when the system of the present invention detects a towing situation between vessels based on detected vehicle/vessel types, time stamp data and velocity comparisons as discussed above, the method of the present invention preferably further includes the step of designating/identifying the vessels under-tow and transmitting an alert to monitored vehicles in a given area to be aware of the hazard.

While the invention has been illustrated and described as embodied in a particular delineator mounting system, it is not intended to be limited to the details shown, since it will be understood that various omissions, modifications, substitutions and changes in the forms and details of the device illustrated and in its operation can be made by those skilled in the art without departing in any way from the spirit of the present invention.

The scope of the present invention should be determined not by the embodiments illustrated, but by the appended claims and their legal equivalents.

What is claimed is:

1. A system for tracking assets during transport, the system comprising:
    a server for receiving vehicle data from a plurality of asset tracking devices;
    a memory configured to store instructions; and
    a system processor configured to execute the instructions to control the processing of the vehicle data;
    wherein the plurality of tracking devices comprise:
        a first tracking device; wherein the first tracking device comprises: a first device processor, a first transceiver, and a first GPS device; and
        a second tracking device; wherein the second tracking device comprises: a second device processor, a second transceiver, and a second GPS device;
    wherein the system processor:
    identifies a first set of tracked assets within a first area of interest; wherein the first set of tracked assets comprises at least a first tracked asset monitored by the first tracking device and a second tracked asset monitored by the second tracking device;
    stores a plurality of velocity profiles for the first set of tracked assets within the first area of interest;
        wherein the plurality of velocity profiles comprise timestamp data indicating when one or more of the first set of tracked assets crosses a first velocity point or a second velocity point;
        wherein the plurality of velocity profiles comprise at least a first velocity profile for the first tracked asset; wherein the first velocity profile comprises a first set of time stamp data indicating when the first tracked asset crosses the first velocity point or the second velocity point;
        wherein the plurality of velocity profiles comprise at least a second velocity profile for the second tracked asset; wherein the second velocity profile comprises a second set of timestamp data indicating when the second tracked asset crosses the first velocity point or the second velocity point;
    compares pairs of the stored plurality of velocity profiles;
    assigns a correlation value to each pair of compared velocity profiles; wherein the correlation value comprises a numerical value indicating how closely a pair of velocity profiles match each other; wherein a first correlation value is assigned to the pairing of the first velocity profile and the second velocity profile;
    designates the first tracked asset and the second tracked asset as coupled when the first correlation value exceeds a first stored threshold correlation value;
    updates the first velocity profile to create an updated first velocity profile, and updates the second velocity profile to create an updated second velocity profile;
    calculates a second correlation value between the updated first velocity profile and the updated second velocity profile; and
    designates the first tracked asset and the second tracked asset as uncoupled when the second correlation value is lower than a second stored threshold correlation value.

2. The system of claim 1, wherein the system processor determines a first set of speed thresholds for travel within the first area of interest.

3. The system of claim 2, wherein the system processor determines the first set of tracked assets within the area of interest at least in part by polling tracked assets within the area of interest.

4. The system of claim 3, wherein the system processor determines the first set of speed thresholds for travel within the first area of interest at least in part by averaging the speed limits within a given area of interest and adjusting the speed thresholds based on the determined average.

5. The system of claim 4, wherein the system processor determines the first set of speed thresholds for travel within the first area of interest at least in part by sampling velocities of one or more tracked vehicles within the first area of interest.

6. The system of claim 5, wherein the system processor determines the first set of speed thresholds for travel within the first area of interest at least in part by initiating a GPS sampling.

7. The system of claim 6, wherein the system processor determines the first set of speed thresholds at least in part by increasing the frequency of the GPS sampling.

8. The system of claim 7, wherein the system processor increases the frequency of the GPS sampling when a movement of a tracked asset is detected.

9. The system of claim 8, wherein the system processor decreases the frequency of the GPS sampling when a first speed threshold is exceeded.

10. The system of claim 9, wherein the system processor reduces the frequency of the GPS sampling for selected pairs of tracked assets when the tracked assets are designated as coupled.

11. The system of claim 1, wherein the system processor selectively operates in a quick selection mode in which the system processor reduces the number of speed thresholds within the first set of speed thresholds.

12. The system of claim 11, wherein the system processor is configured to switch from the quick selection mode to a second selection mode after a pre-set period of time.

13. A non-transitory storage medium storing a program causing a computer within an asset tracking system to execute a set of processing functions; wherein the asset tracking system comprises:
    a server for receiving vehicle data from a plurality of asset tracking devices; wherein the plurality of tracking devices comprise:

a first tracking device; wherein the first tracking device comprises: a first device processor, a first transceiver, and a first GPS device; and a second tracking device; wherein the second tracking device comprises: a second device processor, a second transceiver, and a second GPS device;

wherein the processing functions comprise:

identifying a first set of tracked assets within a first area of interest; wherein the first set of tracked assets comprises at least a first tracked asset monitored by the first tracking device and a second tracked asset monitored by the second tracking device;

storing a plurality of velocity profiles for the first set of tracked assets within the first area of interest;

wherein the plurality of velocity profiles comprise timestamp data indicating when one or more of the first set of tracked assets crosses a first velocity point or a second velocity point;

wherein the plurality of velocity profiles comprise at least a first velocity profile for the first tracked asset; wherein the first velocity profile comprises a first set of time stamp data indicating when the first tracked asset crosses the first velocity point or the second velocity point;

wherein the plurality of velocity profiles comprise at least a second velocity profile for the second tracked asset; wherein the second velocity profile comprises a second set of timestamp data indicating when the second tracked asset crosses the first velocity point or the second velocity point;

comparing pairs of the stored plurality of velocity profiles; assigning a correlation value to each pair of compared velocity profiles; wherein the correlation value comprises a numerical value indicating how closely a pair of velocity profiles match each other; wherein a first correlation value is assigned to the pairing of the first velocity profile and the second velocity profile;

designating the first tracked asset and the second tracked asset as coupled when the first correlation value exceeds a first stored threshold correlation value;

updating the first velocity profile to create an updated first velocity profile, and updating the second velocity profile to create an updated second velocity profile;

calculating a second correlation value between the updated first velocity profile and the updated second velocity profile; and designating the first tracked asset and the second tracked asset as uncoupled when the second correlation value is lower than a second stored threshold correlation value.

14. The non-transitory storage medium of claim 13, wherein the processing functions comprise determining a first set of speed thresholds for travel within the first area of interest.

15. The non-transitory storage medium of claim 14, wherein the processing functions comprise determining the first set of tracked assets within the area of interest at least in part by polling tracked assets within the area of interest.

16. The non-transitory storage medium of claim 15, wherein the processing functions comprise determining the first set of speed thresholds for travel within the first area of interest at least in part by averaging the speed limits within a given area of interest and adjusting the speed thresholds based on the determined average.

17. The non-transitory storage medium of claim 16, wherein the processing functions comprise determining the first set of speed thresholds for travel within the first area of interest at least in part by sampling velocities of one or more tracked vehicles within the first area of interest.

18. The non-transitory storage medium of claim 17, wherein the processing functions comprise determining the first set of speed thresholds for travel within the first area of interest at least in part by initiating a GPS sampling.

19. The non-transitory storage medium of claim 18, wherein the processing functions comprise reducing the frequency of the GPS sampling for selected pairs of tracked assets when the tracked assets are designated as coupled.

\* \* \* \* \*